United States Patent
Vaarno et al.

(10) Patent No.: US 9,863,017 B2
(45) Date of Patent: Jan. 9, 2018

(54) SOLVENT EXTRACTION SETTLER ARRANGEMENT

(71) Applicant: OUTOTEC (FINLAND) OY, Espoo (FI)

(72) Inventors: Jussi Vaarno, Sundsberg (FI); Rami Saario, Espoo (FI); Henri Fredriksson, Helsinki (FI)

(73) Assignee: Outotec (Finland) Oy, Espoo (FI)

( * ) Notice: Subject to any disclaimer, the term of this patent is extended or adjusted under 35 U.S.C. 154(b) by 48 days.

(21) Appl. No.: 14/407,187

(22) PCT Filed: Jun. 12, 2013

(86) PCT No.: PCT/FI2013/050638
§ 371 (c)(1),
(2) Date: Dec. 11, 2014

(87) PCT Pub. No.: WO2014/001620
PCT Pub. Date: Jan. 3, 2014

(65) Prior Publication Data
US 2015/0159236 A1    Jun. 11, 2015

(30) Foreign Application Priority Data
Jun. 26, 2012 (FI) .................................. 20125715

(51) Int. Cl.
*C22B 3/02* (2006.01)
*B01D 11/04* (2006.01)
(Continued)

(52) U.S. Cl.
CPC ................ *C22B 3/02* (2013.01); *B01D 11/04* (2013.01); *B01D 11/0446* (2013.01);
(Continued)

(58) Field of Classification Search
CPC . B01D 11/04; B01D 11/0446; B01D 11/0484; B01D 17/0214; C22B 3/02
(Continued)

(56) References Cited

U.S. PATENT DOCUMENTS 2,258,982 A    12/1938    Gordon et al.
2,728,457 A    12/1955    Clarke
(Continued)

FOREIGN PATENT DOCUMENTS

CN    1216932 A    5/1999
CN    1216933 A    5/1999
(Continued)

OTHER PUBLICATIONS

Intellectual Property Office of the People's Republic of China; First Office Action issued in application No. 201380037899.8; dated Oct. 29, 2015; 5 pages; Beijing, China.
(Continued)

*Primary Examiner* — Scott Kastler
*Assistant Examiner* — Michael Aboagye
(74) *Attorney, Agent, or Firm* — Chernoff, Vilhauer, McClung & Stenzel LLP

(57) ABSTRACT

A solvent extraction settler arrangement comprising a mixing unit for preparing a dispersion from mutually immiscible solutions and a settler having a feed end and a discharge end. The settler is arranged to separate solution phases from a dispersion fed from the feed end while the dispersion flows towards the discharge end. The arrangement further comprises a feeding device located at the feed end for feeding the dispersion prepared by the mixing unit to the settler. The feeding device comprises an elongated feed launder having a first end for receiving the dispersion from the mixing unit, and a second end. The feed launder extends alongside the feed end of the settler. The feed launder has a form of a (Continued)

conical tube with a cross-section converging towards the second end and an inclined bottom ascending towards the second end. A plurality of feed pipes are arranged along the length of the feed launder at a distance from each other, each feed pipe having a third end opening to the inner space of the feed launder at the bottom to receive the dispersion from the feed launder and a fourth end opening to the settler to conduct the dispersion to the settler.

7 Claims, 4 Drawing Sheets

(51) Int. Cl.
*C22B 3/20* (2006.01)
*B01D 17/02* (2006.01)

(52) U.S. Cl.
CPC ...... *B01D 11/0484* (2013.01); *B01D 17/0214* (2013.01); *C22B 3/20* (2013.01)

(58) Field of Classification Search
USPC ........ 266/170; 75/726; 210/532.1, 634, 511, 210/519
See application file for complete search history.

(56) References Cited

U.S. PATENT DOCUMENTS

| | | |
|---|---|---|
| 2,868,384 A | 1/1959 | Puddington |
| 3,419,145 A | 12/1968 | De Celis |
| 3,544,079 A | 12/1970 | Dressler |
| 4,218,311 A | 8/1980 | Newrick |
| 4,294,702 A | 10/1981 | Finsterwalder |
| 4,476,018 A | 10/1984 | White et al. |
| 4,656,067 A | 4/1987 | Yetter |
| 4,747,948 A | 5/1988 | North |
| 5,103,641 A | 4/1992 | Maus et al. |
| 5,185,081 A | 2/1993 | Nyman et al. |
| 5,266,191 A | 11/1993 | Greene et al. |
| 5,435,924 A | 7/1995 | Albertson |
| 5,552,050 A | 9/1996 | Valentin |
| 5,558,780 A | 9/1996 | Vancas |
| 5,585,008 A | 12/1996 | Ilg et al. |
| 5,662,861 A | 9/1997 | Taylor |
| 5,662,871 A | 9/1997 | Nyman et al. |
| 6,083,400 A * | 7/2000 | Nyman .............. B01D 11/0457 210/511 |
| 6,132,615 A * | 10/2000 | Nyman .............. B01D 17/0211 210/511 |
| 6,176,608 B1 * | 1/2001 | Nyman .............. B01D 11/0453 366/150.1 |
| 6,245,243 B1 | 6/2001 | Meurer |
| 6,267,900 B1 | 7/2001 | Nyman et al. |
| 6,432,370 B1 | 8/2002 | Nyman et al. |
| 6,558,558 B1 | 5/2003 | Hall |
| 6,977,038 B2 | 12/2005 | Jowett |
| 7,390,420 B2 | 6/2008 | Nyman et al. |
| 7,507,343 B2 | 3/2009 | San Lorenzo et al. |
| 7,517,461 B2 | 4/2009 | Nyman et al. |
| 7,611,635 B2 | 11/2009 | Chieng et al. |
| 7,731,853 B2 | 6/2010 | Ekman et al. |
| 8,858,799 B2 | 10/2014 | Nyman et al. |
| 2004/0096608 A1 | 5/2004 | King et al. |
| 2005/0040106 A1 | 2/2005 | Gigas et al. |
| 2006/0113246 A1 | 6/2006 | Ekman et al. |
| 2007/0263486 A1 | 11/2007 | Suhner |
| 2009/0104504 A1 | 4/2009 | Roussin-Bouchard et al. |
| 2010/0051548 A1 | 3/2010 | Dorlac et al. |
| 2011/0236152 A1 | 9/2011 | Lu et al. |
| 2011/0297606 A1 | 12/2011 | Vaarno |
| 2011/0303619 A1 | 12/2011 | Nyman et al. |
| 2012/0171006 A1 | 7/2012 | Berry et al. |
| 2014/0110359 A1 | 4/2014 | Haywood et al. |
| 2015/0151218 A1 | 6/2015 | Vaarno et al. |
| 2015/0151460 A1 | 6/2015 | Saario et al. |
| 2015/0159236 A1 | 6/2015 | Vaarno et al. |
| 2015/0182874 A1 | 7/2015 | Vaarno et al. |
| 2015/0190732 A1 | 7/2015 | Vaarno et al. |
| 2015/0190734 A1 * | 7/2015 | Vaarno .............. C22B 3/02 210/532.1 |
| 2015/0232960 A1 | 8/2015 | Vaarno et al. |
| 2016/0130681 A1 | 5/2016 | Vaarno et al. |

FOREIGN PATENT DOCUMENTS

| | | | |
|---|---|---|---|
| CN | 2480439 | | 3/2002 |
| CN | 1652853 A | | 8/2005 |
| CN | 1652855 A | | 8/2005 |
| CN | 2748146 Y | | 12/2005 |
| CN | 1805773 A | | 7/2006 |
| CN | 201071566 Y | | 6/2008 |
| CN | 201101901 | | 8/2008 |
| CN | 101449012 B | | 6/2009 |
| CN | 201366254 Y | | 12/2009 |
| CN | 102292133 A | | 12/2011 |
| CN | 202128943 Y | | 2/2012 |
| DE | 3704326 * | 7/1988 | ............ B01D 11/04 |
| DE | 3704326 A1 | | 8/1988 |
| EP | 0156699 A1 | | 10/1985 |
| EP | 0430248 A2 | | 6/1991 |
| EP | 0973595 B1 | | 9/2001 |
| EP | 2019890 A1 | | 2/2009 |
| EP | 2114548 A2 | | 11/2011 |
| GB | 335912 | | 5/1960 |
| GB | 2341340 A | | 3/2000 |
| GB | 2476102 A | | 6/2011 |
| JP | 2001-29703 A | | 2/2001 |
| JP | 2001029703 | | 2/2001 |
| NO | 20015454 A | | 11/2006 |
| WO | 9740899 | | 11/1997 |
| WO | 9740900 | | 11/1997 |
| WO | 9740901 A1 | | 11/1997 |
| WO | 9741938 | | 11/1997 |
| WO | 0074895 A1 | | 12/2000 |
| WO | 03097207 A1 | | 11/2003 |
| WO | 2007135221 A1 | | 11/2007 |
| WO | 2008094151 A1 | | 8/2008 |
| WO | 2009004321 A2 | | 1/2009 |
| WO | 2009063128 A1 | | 5/2009 |
| WO | 2010089462 A1 | | 8/2010 |
| WO | 2010097516 A1 | | 9/2010 |
| WO | 2010131982 A2 | | 11/2010 |
| WO | 2011113110 A1 | | 6/2011 |
| WO | 2011088516 A1 | | 7/2011 |
| WO | 2012026345 A1 | | 3/2012 |

OTHER PUBLICATIONS

The International Bureau of WIPO, International Preliminary Report on Patentability w/ attached Written Opinion of the International Searching Authority, issued in pending PCT application PCT/FI2013/050638, dated Dec. 31, 2014, 6 pages, World Intellectual Property Organization, Geneva, Switzerland.

European Patent Office; Extended European Search Report issued in application No. 13809503.9; dated Mar. 17, 2016; 6 pages; Munich, Germany.

International Search report from corresponding International Application No. PCT/FI2013/050638, dated Sep. 20, 2013, 3 pgs.

U.S., Office action issued in U.S. Appl. No. 14/408,703, dated Jun. 14, 2016, 9 pages, USPTO, Alexandria, VA.

U.S., Office action issued in U.S. Appl. No. 14/408,711, dated Jun. 17, 2016, 11 pages, USPTO, Alexandria, VA.

Canadian Intellectual Property Office; Office Action issued in Application No. 2,875,939; dated Sep. 15, 2015; 4 pgs.; Montreal, Quebec, Canada.

European Patent Office, Extended European Search Report issued in application No. 13808497, dated Feb. 11, 2016, 9 pages, European Patent Ofice, Munich, Germany.

(56) References Cited

OTHER PUBLICATIONS

European Patent Office, Extended European Search Report issued in application No. 13810173.8, dated Mar. 17, 2016, Munich, Germany.
European Patent Office; Extended European Search Report issued in application No. 13810718.0; dated Mar. 7, 2016; 6 pages; Munich, Germany.
European Patent Office, Extended European Search Report issued in application No. 13809197.0, dated Mar. 21, 2016, 9 pages, Munich, Germany.
European Patent Office; Partial Supplementary European Search Report issued in application No. 13810326.2; dated Apr. 5, 2016; 6 pages; Munich, Germany.
Finnish Search report from priority Finnish Application No. 20125712, dated Apr. 8, 2013, 1 pg.
Finnish Search report from priority Finnish Application No. 20125714, dated Apr. 8, 2013., 1 pg.
Finnish Search report from priority Finnish Application No. 20125715, dated Apr. 16, 2013, 1 pg.
Finnish Search report from priority Finnish Application No. 20125717, dated Apr. 19, 2013, 1 pg.
Finnish Search report from priority Finnish Application No. 20125718, dated Apr. 19, 2013, 1 pg.
Finnish Patent and Registration Office, Opinion on Patentability issued in Application No. 20125714, dated Jan. 21, 2016, Helsinki, Finland.
International Bureau of WIPO, International Preliminary Report on Patentability issued in application No. PCT/FI2013/050640, Dec. 31, 2014, Geneva, Switzerland.
International Searching Authority of WIPO, Written Opinion of the International Searching Authority issued in application No. PCT/FI2013/050640, Sep. 20, 2013, Geneva, Switzerland.
International Bureau of WIPO, International Preliminary Report on Patentability w/ attached Written Opinion of the International Searching Authority issued in pending PCT application No. PCT/F12013/050641, dated Dec. 31, 2014, 7 pages, World Intellectual Property Organization Geneva, Switzerland.
International Search report from corresponding International Application No. PCT/FI2013/050637, dated Oct. 9, 2013, 3 pgs.
International Search report from corresponding International Application No. PCT/FI2013/050639; dated Nov. 27, 2013, 6 pgs.
International Search report from corresponding International Application No. PCT/FI2013/050640, dated Sep. 30, 2013, 3 pgs.
International Search report from corresponding International Application No. PCT/FI2013/050641, dated Sep. 7, 2013, 3 pgs.
Miller, Graeme, Design of Mixer-Settlers to Maximize Performance:, Miller Metallurgical Services, ALTA COPPER-10, May 2006, 26 pgs.
Plastic Moulding Process, Jiang Shui Qing, Li Hai Ling, Chemical Industry Publishing House, Aug. 31, 2009, pp. 172-173, Figs. 9-11.
R.J. Crawford and M.P. Kearns, Queens' University, Belfast, Introduction to the Rotational Moulding Process:, Practical Guide to Rotational Moulding, 2003, Chapter 1.
State Intellectual Property Office of the People's Republic of China; Notification of First Office Action issued in application No. 201380037892.6; dated Aug. 31, 2015, Beijing, China.
State Intellectual Property Office of the People's Republic of China, Office Action issued in Application No. 201380034067.0, dated Mar. 3, 2016, 7 Pages, Beijing, China.
State Intellectual Property Office of the People's Republic of China; First Office Action issued in application No. 201380034064.7, dated Nov. 3, 2015; 7 pages; Beijing, China.
State Intellectual Property Office of the People's Republic of China; Notification of First Office Action issued in Application No. 201380034124.5; dated Dec. 16, 2015; 15 pages; Beijing, China.
State Intellectual Property Office of the People's Republic of China, Office action issued in application No. 201380037888.X, dated Dec. 3, 2015, 6 pages, Beijing, China.
Taylor, Alan and Jansen, Malcolm L., "Solvent Extraction Mixer-Settler Design", Intl. Project Dev. Services Ltd., ALTA Free Paper, 10 pgs.
USPTO, Office action issued in U.S. Appl. No. 14/408,703, dated Jun. 14, 2016, 9 pages, USPTO, Alexandria, VA.
Pending U.S. Appl. No. 14/408,398, filed Dec. 16, 2014.
Pending U.S. Appl. No. 14/408,417, filed Dec. 16, 2014.
Pending U.S. Appl. No. 14/407,173, filed Dec. 11, 2014.
Pending U.S. Appl. No. 14/407,219, filed Dec. 11, 2014.
Pending U.S. Appl. No. 14/408,703, filed Dec. 17, 2014.
Pending U.S. Appl. No. 14/408,711, filed Dec. 17, 2014.
State Intellectual Property Office of the People's Republic of China, Notification of the Second Office Action issued in Application No. 201380034064.7, dated Aug. 15, 2016, 16 pages, Beijing, China.
European Patent Office; Extended European Search Report, issued in European Application No. 13810326.2, dated Sep. 29, 2016; 11 pages; Helsinki, Finland.
European Patent Office; Communication pursuant to Article 94(3) EPC; office action; Oct. 23, 2017; 4 pages; European Patent Office, Munich, Germany.

* cited by examiner

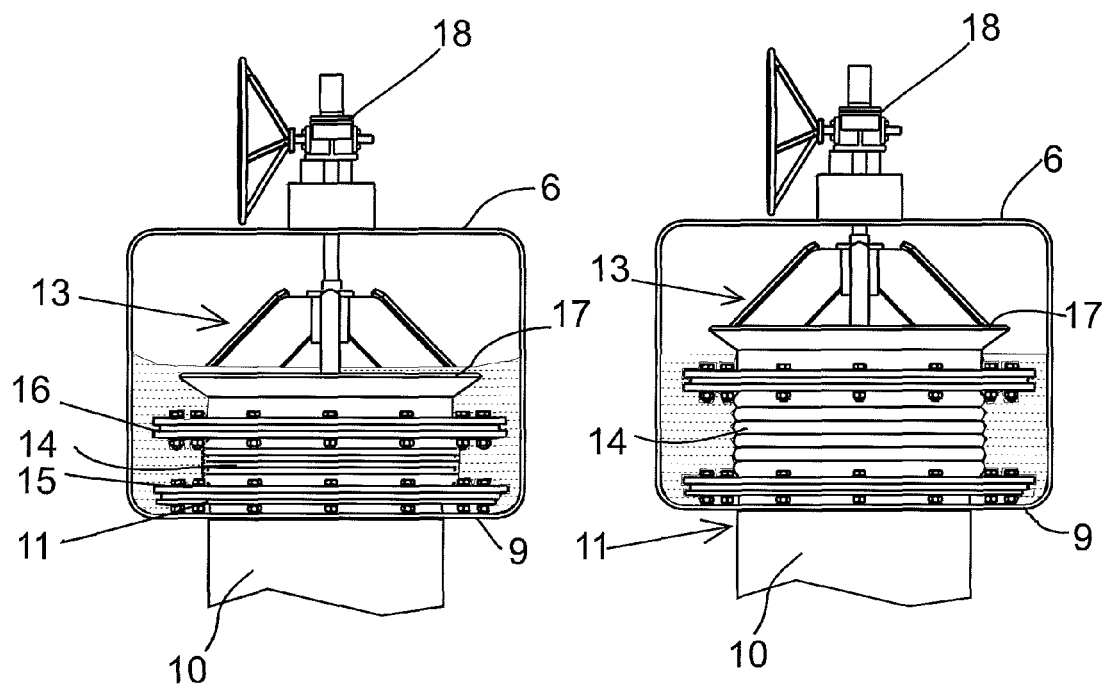

SOLVENT EXTRACTION SETTLER ARRANGEMENT

This is a national stage application filed under 35 USC 371 based on International Application No. PCT/FI2013/050638, filed Jun. 12, 2013 and claims priority under 35 USC 119 of Finnish Patent Application No. 20125715 filed Jun. 26, 2012.

FIELD OF THE INVENTION

The present invention relates to a solvent extraction settler arrangement adapted for hydrometallurgical liquid-liquid extraction processes.

BACKGROUND OF THE INVENTION

As disclosed in e.g. publications WO 97/40899, WO 97/40900 and WO 97/41938 a solvent extraction settler arrangement is known which is adapted for hydrometallurgical liquid-liquid extraction processes and which typically comprises a mixing unit for preparing a dispersion from mutually immiscible solutions. A settler is arranged to separate solution phases from a dispersion fed from the feed end while the dispersion flows towards the discharge end of the settler. A feeding device is located at the feed end for feeding the dispersion prepared by the mixing unit to the settler.

In the known technology the dispersion is fed into the settler at a single feed point located at the center of the feed end or in the vicinity thereof via an uptake channel. The problem is that the single feed point feeding dispersion requires a distribution fence to be arranged near the feed end of the settler to distribute the flow of the dispersion to the whole width of the settler.

OBJECT OF THE INVENTION

The object of the invention is to eliminate the disadvantages mentioned above.

In particular, it is the object of the invention to provide a feeding device which eliminates the need for the distribution fence and the uptake channel and still is able to provide a uniform mass flow distribution of the dispersion to the settler.

SUMMARY OF THE INVENTION

According to an aspect of the invention, the present invention provides a solvent extraction settler arrangement adapted for hydrometallurgical liquid-liquid extraction processes. The settler arrangement comprises a mixing unit for preparing a dispersion from mutually immiscible solutions, a settler having a feed end and a discharge end, said settler being arranged to separate solution phases from a dispersion fed from the feed end while the dispersion flows towards the discharge end, and a feeding device located at the feed end for feeding the dispersion prepared by the mixing unit to the settler.

In accordance with the invention, the feeding device comprises an elongated feed launder having a first end for receiving the dispersion from the mixing unit, and a second end. The feed launder extends alongside the feed end of the settler. The feed launder has a form of a conical tube with a cross-section converging towards the second end and an inclined bottom ascending towards the second end. A plurality of feed pipes are arranged along the length of the feed launder at a distance from each other, each feed pipe having a third end opening to the inner space of the feed launder at the bottom to receive the dispersion from the feed launder and a fourth end opening to the settler to conduct the dispersion to the settler.

The advantage of the invention is that, when used in connection with a large settler tank, the multiple point feed of the dispersion provided by a plurality of feed pipes ensures a uniform mass flow distribution of the dispersion to multiple feed points. When used in connection with a settler consisting of mutually separate settler sections, the advantage is that dispersion can be fed uniformly via a feed pipe to each settler section. The dispersion flow distributes uniformly to the whole width of the tank so that a single uptake channel and distribution fence are no more needed. The shape of the feed launder also allows minimizing the generation of small droplets. The conical shape of the feed launder also ensures that the flow rate of the dispersion in the feed launder is constant so that the residence time distribution in the launder is as uniform as possible, so that no standing zones where the separation of the phases could occur are formed. The conical shape and the inclined bottom of the feed launder ensure that the heavier solution phase, which may separate from the dispersion already in the feed launder, flows back to the first end of the feed launder and further to the mixing unit. The feed launder being a tube has an advantage that it can be made air-tight. The air-tight construction eliminates oxidation of the reagent, thus lowering make-up costs. The air-tight construction also decreases evaporation of the reagent, thus also lowering make-up costs.

In one embodiment of the settler arrangement, the feed launder is a hollow body made of a fibre-reinforced plastic composite and manufactured by filament winding technology. Manufacturing of the feed launder made of a fibre-reinforced plastic composite by filament winding gives the lauder a required strength. Automated filament winding of the launder enables lower fabrication costs compared to any other manufacturing method, such as hand laminating.

In one embodiment of the settler arrangement, the feed launder is a hollow body made of steel.

In one embodiment of the settler arrangement, the arrangement comprises a level control valve connected to the third end of each feed pipe inside the feed launder.

In one embodiment of the settler arrangement, the level control valve comprises an extendable and collapsible tube member, such as a bellows tube, having a lower end connected to the third end of the feed pipe, and an upper end. An overflow lip is attached at the upper end of the tube member. An actuator is connected to the overflow lip for vertical adjustment of the height position of the overflow lip.

In one embodiment of the settler arrangement, the settler consists of one tank having a single uniform flow space. All feed pipes open to said single flow space.

In one embodiment of the settler arrangement, the settler consists of a plurality of mutually separated elongated parallel settler sections each extending from the feed end to the discharge end and forming a plurality of parallel flow spaces. At least one feed pipe is connected to each settler section. Parallel settler sections allow a plug flow of the dispersion and solutions through the settler section. An advantage with the parallel settler section design is that, if needed for maintenance, an individual settler section can be shut off from the process simply by interrupting the dispersion flow to the settler section by lifting the overflow lip in connection with the respective feed pipe above the level of the dispersion in the feed launder.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
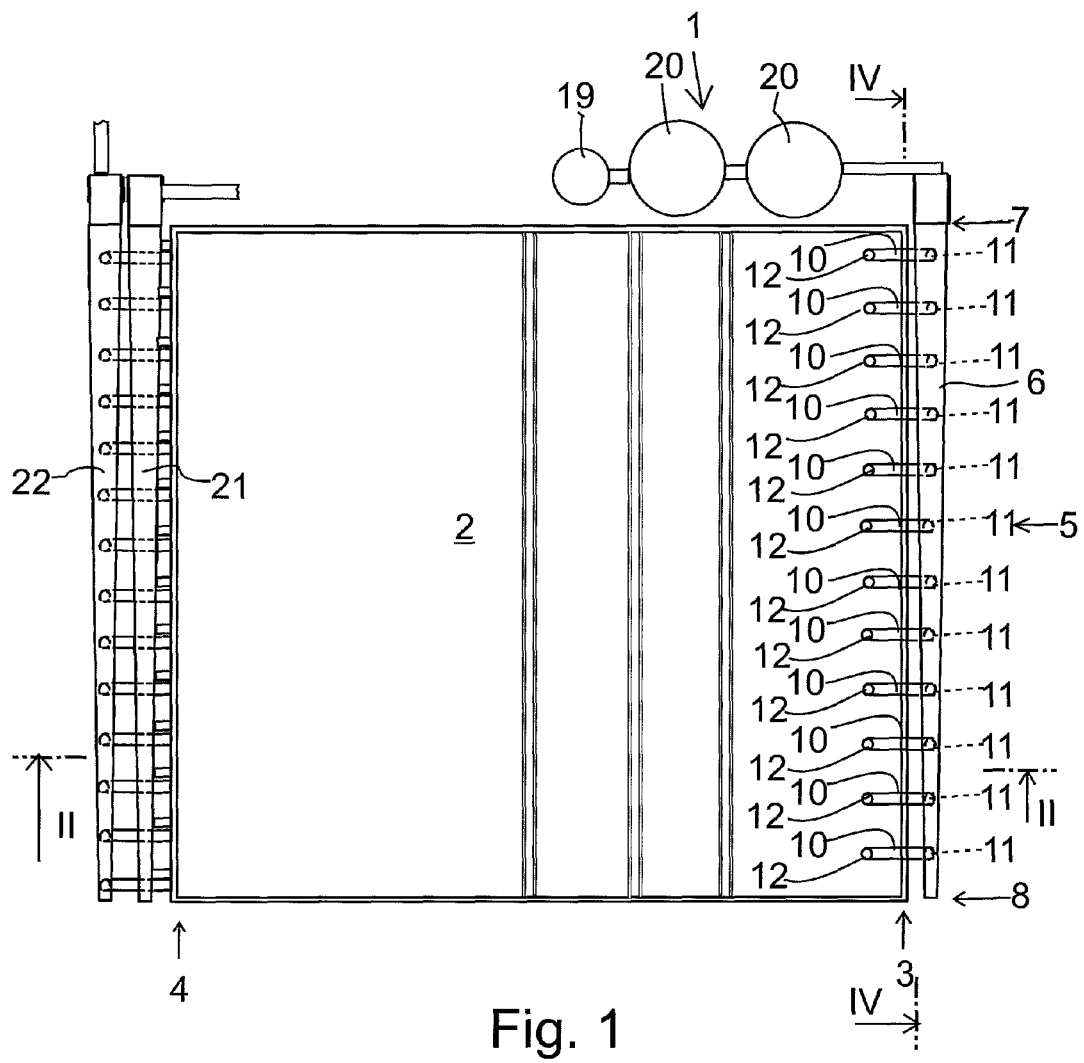
FIG. 1 shows a plan view of a settler arrangement according to a first embodiment of the invention.
Figure 2:
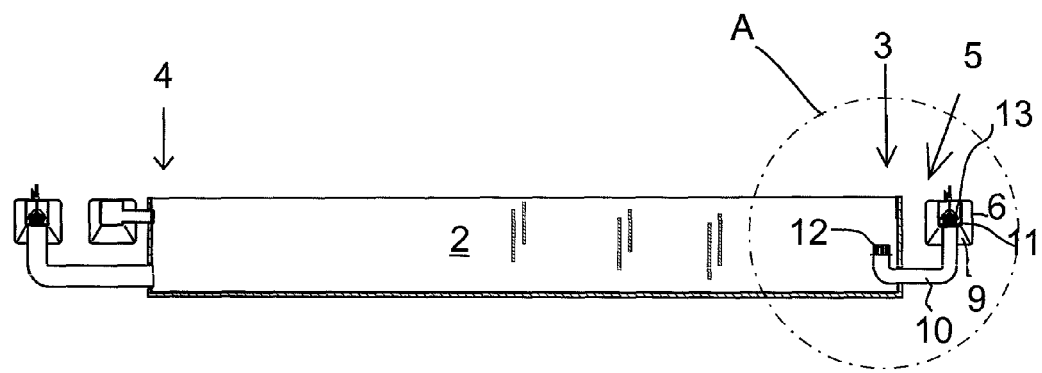
FIG. 2 shows a section II-II from FIG. 1.
Figure 3:
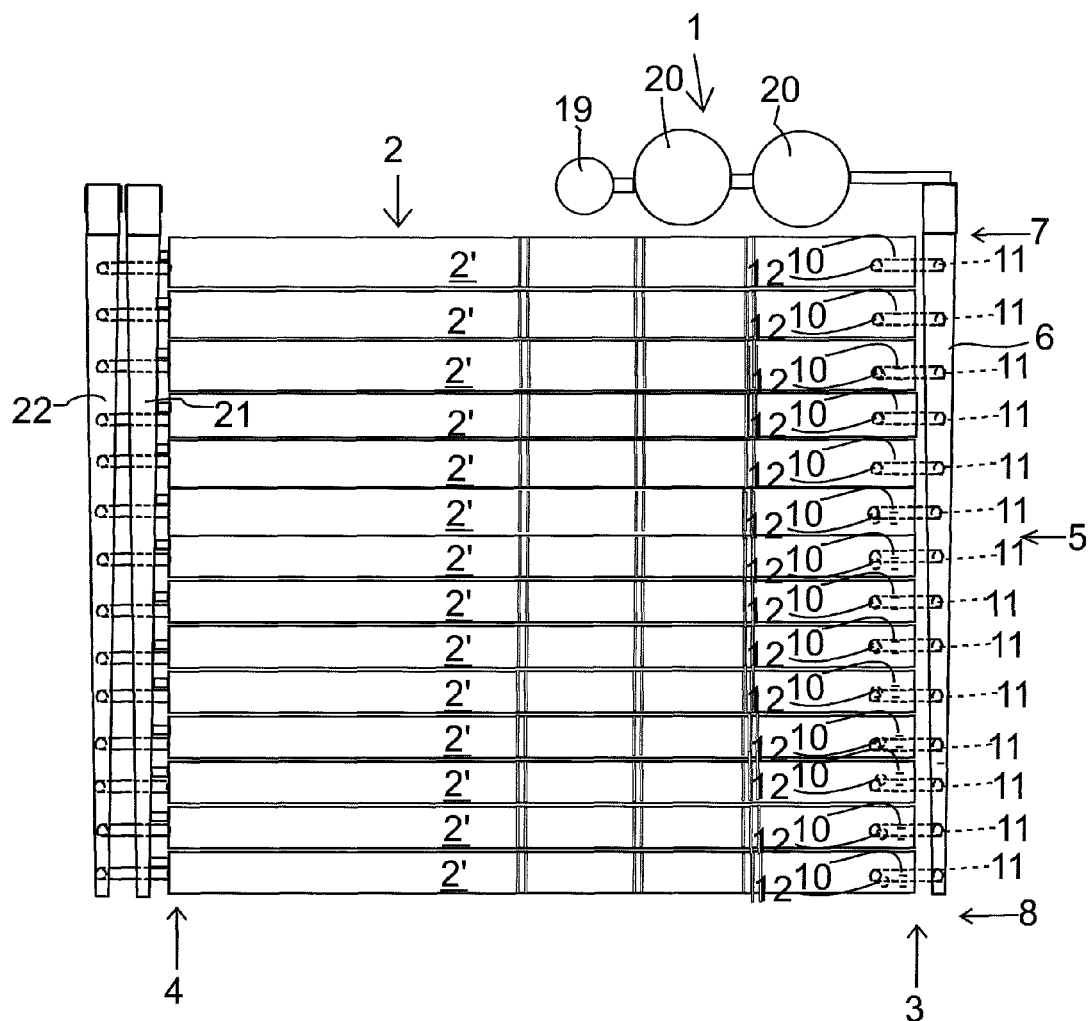
FIG. 3 shows a plan view of a settler arrangement according to a second embodiment of the invention.

FIGS. 1 and 3 show solvent extraction settler arrangements which are adapted for hydrometallurgical liquid-liquid extraction processes.

The settler arrangement comprises a mixing unit 1 for preparing a dispersion from mutually immiscible solutions. The mixing unit 1 includes, in this case, a pumping unit 19 and two mixers 20. A settler 2 is arranged to separate solution phases from a dispersion which is fed from the feed end 3 while the dispersion flows towards the discharge end 4. A feeding device 5 is arranged at the feed end 3 for feeding the dispersion prepared by the mixing unit 1 to the settler 2. Discharge launders 21 and 22 are arranged at the discharge end 4 to receive and discharge the separated solutions.

Figure 4:
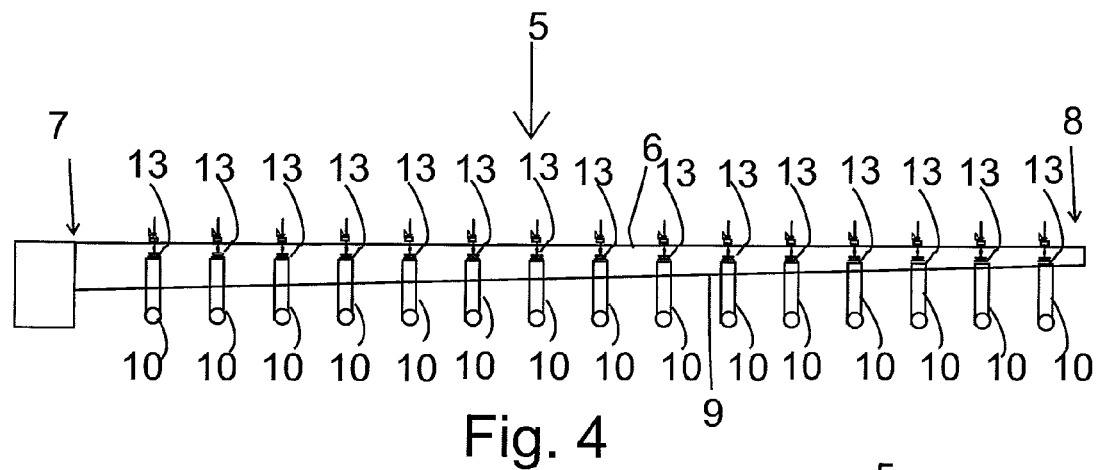
FIG. 4 shows a section IV-IV from FIG. 1.
Figure 5:
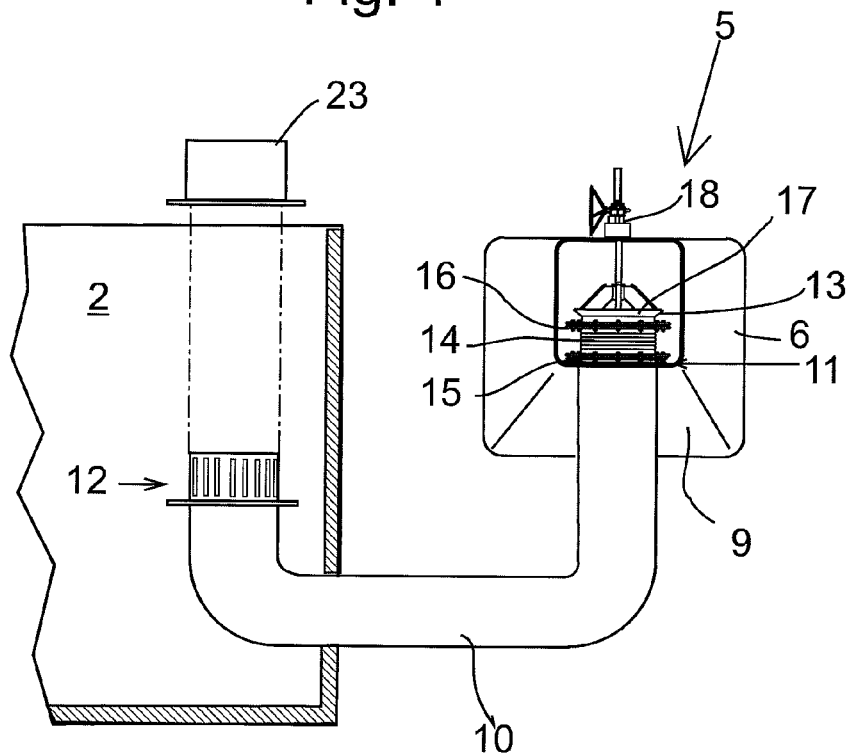
FIG. 5 shows an enlarged detail A from FIG. 2, FIGS. 6 and 7 show a level control valve in two positions.

The feeding device 5 comprises an elongated feed launder 6. From the mixing unit 1 the dispersion is conducted to a first end 7 of the feed launder 6. The feed launder 6 extends alongside the feed end 3 of the settler 2. The feed launder 5 has a form of a conical tube with a cross-section converging towards the second end 8 of the feed launder 6. The feed launder 6 has a form of a conical tube which has substantially a form of a square pyramid with cambered edges. The feed launder 6 may be made of steel or fibre-reinforced plastic composite. Preferably the feed launder 6 is a hollow body made of a fibre-reinforced plastic composite and manufactured by filament winding technology. As can be seen in FIG. 5, the cross-section of the feed launder is substantially rectangular with cambered corners. Such a form allows it to be easily detached from the mandrel on which it is wound. Further, referring to FIGS. 4 and 5, the feed launder also has an inclined bottom 9 which linearly ascends from the first end 7 to the second end 8 of the feed launder 6.

A plurality of feed pipes 10 are arranged along the length of the feed launder 6 at a distance from each other. Each feed pipe 10 has a third end 11 which opens to the inner space of the feed launder 6 at the bottom 9 to receive the dispersion from the feed launder 6. Each feed pipe 10 has a fourth end 12 which opens to the settler 2 to conduct the dispersion to the settler 2.

In the embodiment shown in FIG. 1 the settler 2 consists of one large tank which has a single uniform flow space which extends widthwise to the whole area of the tank and lengthwise from the feed end 3 to the discharge end 4. In this case, all the feed pipes 10 open to said single uniform flow space.

In the embodiment shown in FIG. 3 the settler 2 consists of a plurality of widthwise mutually separated elongated parallel settler sections 2' each extending from the feed end 3 to the discharge end 4 and forming a plurality of parallel flow spaces. At least one feed pipe 10 is arranged between the feed launder 6 and each settler section 2' to feed dispersion from the feed launder 6 to said settler section.

As can be seen in FIGS. 5 to 7, a level control valve 13 is connected to the third end 11 of each feed pipe 10 inside the feed launder 6. The level control valve 13 comprises an extendable and collapsible tube member 14, such as a bellows tube. The tube member 14 has its lower end 15 connected to the third end 11 of the feed pipe 10. An overflow lip 17 is attached at the upper end of the tube member 14. An actuator 18 is connected to the overflow lip 17 for vertical adjustment of the height position of the overflow lip.

FIG. 6 shows the level control valve 13 in a position in which the overflow lip 17 is at a level below the surface level of the dispersion in the feed launder 6 whereby the dispersion is allowed to flow to the feed pipe 10.

FIG. 7 shows that the level control valve 13 is lifted to a position in which the overflow lip 17 is above the surface level of the dispersion in the feed launder 6 whereby the flow of the dispersion from the feed launder 6 to the feed pipe 10 is interrupted and no dispersion flows to the settler 2 or settler section 2. Safety can be ensured by attaching also a shut-off cap 23 tightly to the fourth end 12 of the feed pipe 10 to prevent any leakage of dispersion from the feed pipe 10.

It is obvious to a person skilled in the art that with the advancement of technology, the basic idea of the invention may be implemented in various ways. The invention and its embodiments are thus not limited to the examples described above; instead, they may vary within the scope of the claims.

The invention claimed is:

1. A solvent extraction settler arrangement adapted for hydrometallurgical liquid-liquid extraction processes, the settler arrangement comprising a mixing unit for preparing a dispersion from mutually immiscible solutions, a settler having a feed end and a discharge end, said settler being arranged to separate solution phases from a dispersion fed from the feed end while the dispersion flows towards the discharge end, a feeding device located at the feed end for feeding the dispersion prepared by the mixing unit to the settler, characterized in that the feeding device comprises an elongated feed launder having a first end for receiving the dispersion from the mixing unit, and a second end, said feed launder extending alongside the feed end of the settler, the feed launder having a form of a conical tube with a cross-section converging towards the second end and an inclined bottom ascending towards the second end, and a plurality of feed pipes arranged along the length of the feed launder at a distance from each other, each feed pipe having a third end that opens to the inner space of the feed launder at the bottom to receive the dispersion from the feed launder and a fourth end that opens to the settler to conduct the dispersion to the settler.

2. The settler arrangement according to claim 1, where the feed launder is a hollow body made of a fibre-reinforced plastic composite and is manufactured by filament winding technology.

3. The settler arrangement according to claim 1, where the feed launder is a hollow body made of steel.

4. The settler arrangement according to claim 1 where the arrangement comprises a level control valve connected to the third end of each feed pipe inside the feed launder.

5. The settler arrangement according to claim 4, where the level control valve comprises
- an extendable and collapsible tube member, such as a bellows tube, having a lower end connected to the third end of the feed pipe, and an upper end,
- an overflow lip attached at the upper end of the tube member, and
- an actuator connected to the overflow lip for vertical adjustment of the height position of the overflow lip.

6. The settler arrangement according to claim 1 where the settler consists of one tank having a single uniform flow space; and that all the feed pipes open to said single flow space.

7. The settler arrangement according to claim 1 where the settler consists of a plurality of mutually separated elongated parallel settler sections each extending from the feed end to the discharge end and forming a plurality of parallel flow spaces; and that at least one feed pipe is connected to each settler section.

\* \* \* \* \*